US012565269B2

(12) United States Patent
Maeda

(10) Patent No.: US 12,565,269 B2
(45) Date of Patent: Mar. 3, 2026

(54) VEHICLE BODY STRUCTURE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 18/348,372

(22) Filed: Jul. 7, 2023

(65) Prior Publication Data

US 2024/0067273 A1 Feb. 29, 2024

(30) Foreign Application Priority Data

Aug. 25, 2022 (JP) ................................. 2022-134477

(51) Int. Cl.
*B62D 25/04* (2006.01)
*B62D 25/14* (2006.01)
*B62D 27/02* (2006.01)

(52) U.S. Cl.
CPC ........... *B62D 25/04* (2013.01); *B62D 25/145* (2013.01); *B62D 27/023* (2013.01)

(58) Field of Classification Search
CPC .... B62D 25/04; B62D 25/145; B62D 21/157; B62D 27/023; B62D 27/065
USPC ........................ 296/193.06, 2, 29, 30, 187.12
See application file for complete search history.

(56) References Cited

U.S. PATENT DOCUMENTS

| | | |
|---|---|---|
| 2017/0267290 A1 | 9/2017 | Ayuzawa et al. |
| 2019/0366820 A1 | 12/2019 | Craig et al. |

FOREIGN PATENT DOCUMENTS

| | | |
|---|---|---|
| JP | S61-092944 A | 5/1986 |
| JP | H03-035873 U | 4/1991 |
| JP | H0752788 Y2 * | 12/1995 |
| JP | H09-076940 A | 3/1997 |
| JP | 6150365 B2 | 6/2017 |
| JP | 2020-147136 A | 9/2020 |

OTHER PUBLICATIONS

JP0752788 Text (Year: 1995).*

(Continued)

*Primary Examiner* — Dennis H Pedder
(74) *Attorney, Agent, or Firm* — SOLARIS Intellectual Property Group, PLLC

(57) ABSTRACT

A vehicle body structure includes: a front pillar lower member configuring a portion, at a vehicle lower side, of a front pillar that configures a portion, at a vehicle front side, of a vehicle body, a cross-section of the front pillar lower member seen from a vehicle up-down direction having a closed cross-section; a front pillar upper member disposed at a vehicle upper side of the front pillar lower member, and the front pillar upper member configuring a portion at a vehicle upper side of the front pillar; and a pillar reinforcing section provided with respect to the front pillar upper member, the pillar reinforcing section being partially insertable into the front pillar lower member, and the pillar reinforcing section being detachably attached to the front pillar lower member by an attachment member.

4 Claims, 7 Drawing Sheets

(56) References Cited

OTHER PUBLICATIONS

English language translation of the following: Office action dated Feb. 18, 2025 from the JPO in a Japanese patent application No. 2022-134477 corresponding to the instant patent application. This office action translation is submitted now in order to supplement the understanding of the cited references which are being disclosed in the instant Information Disclosure Statement.

* cited by examiner

VEHICLE BODY STRUCTURE

CROSS-REFERENCE TO RELATED APPLICATION

This application is based on and claims priority under 35 USC 119 from Japanese Patent Application No. 2022-134477, filed Aug. 25, 2022, the entire disclosure of which is incorporated by reference herein.

BACKGROUND

Technical Field

The present disclosure relates to a vehicle body structure.

Related Art

Japanese Patent No. 6150365 discloses an invention relating to an automotive vehicle body. In this automotive vehicle body, a lower end portion of a front pillar upper member is fastened to a front pillar lower member by a bolt, providing a configuration that enables a connection state between the front pillar upper member and the front pillar lower member to be released.

However, in the aforementioned technology, the lower end portion of the front pillar upper member is connected in a state in which the lower end portion of the front pillar upper member is mounted on an upper end portion of the front pillar lower member.

Consequently, it is difficult to ensure rigidity with respect to a load in a vehicle width direction at a boundary portion between the front pillar upper member and the front pillar lower member.

SUMMARY

In consideration of the above circumstance, the present disclosure obtains a vehicle body structure that enables releasing of a connection state between a front pillar upper member and a front pillar lower member, while making it possible to ensure rigidity with respect to a load in a vehicle width direction at a boundary portion between the front pillar upper member and the front pillar lower member.

A vehicle body structure according to a first aspect of the present disclosure includes: a front pillar lower member configuring a portion at a vehicle lower side of a front pillar, which configures a portion at a vehicle front side of a vehicle body, a cross-section of the front pillar lower member seen from a vehicle up-down direction having a closed cross-section; a front pillar upper member disposed at a vehicle upper side of the front pillar lower member, and the front pillar upper member configuring a portion at a vehicle upper side of the front pillar; and a pillar reinforcing section provided with respect to the front pillar upper member, the pillar reinforcing section being partially insertable into the front pillar lower member, and the pillar reinforcing section being detachably attached to the front pillar lower member by an attachment member.

According to the vehicle body structure of the first aspect, a portion at the vehicle lower side of the front pillar is formed by the front pillar lower member, and a cross-section of the front pillar lower member seen from the vehicle up-down direction has a closed cross-section.

Further, the front pillar upper member forming a portion at the vehicle upper side of the front pillar is disposed at the vehicle upper side of the front pillar lower member.

It is considered that, if a lower end section of the front pillar upper member is connected in a state in which it is mounted at an upper end section of the front pillar lower member, rigidity of a boundary portion between the front pillar upper member and the front pillar lower member with respect to a load in the vehicle width direction may be insufficient.

In this regard, in the present aspect, the pillar reinforcing section is provided with respect to the front pillar upper member. Further, the pillar reinforcing section is in a state in which a portion thereof is inserted into the front pillar lower member.

Consequently, when a load in the vehicle width direction is input to the boundary portion between the front pillar upper member and the front pillar lower member in the front pillar, the load is supported by portions of the pillar reinforcing section and the front pillar lower member, enabling bending rigidity with respect to the load in the front pillar to be ensured.

Further, the pillar reinforcing section is detachably attached to the front pillar lower member with the attachment member, and thus, in the present disclosure, the front pillar upper member can be detached from the front pillar lower member.

A vehicle body structure according to a second aspect of the present disclosure is the vehicle body structure according to the first aspect, which further includes a supporting section that is disposed at an inner side of the pillar reinforcing section and the supporting section includes a penetrating section extending in a vehicle width direction, wherein the attachment member is inserted through the penetrating section and connects the front pillar lower member and the supporting section in the vehicle width direction.

According to the vehicle body structure of the second aspect, the supporting section, which includes the penetrating section extending in the vehicle width direction, is disposed at the inner side of the pillar reinforcing section. Further, the attachment member is inserted through the penetrating section of the supporting section, and connects the front pillar lower member and the pillar reinforcing section in the vehicle width direction.

Consequently, connection points between the pillar reinforcing section and the front pillar lower member can be consolidated in the vehicle width direction, and the pillar reinforcing section and the front pillar lower member can be connected to each other without performing work for connecting the pillar reinforcing section and the front pillar lower member at both the vehicle width direction outer side and the vehicle width direction inner side.

Further, the pillar reinforcing section is reinforced by the supporting section, enabling deformation of the pillar reinforcing section due to a load in the vehicle width direction to be suppressed.

A vehicle body structure according to a third aspect of the present disclosure is the vehicle body structure according to the first aspect or the second aspect, wherein an end portion in a vehicle width direction of an instrument panel reinforcement is configured to be fixed to the vehicle body by the attachment member that connects the pillar reinforcing section and the front pillar lower member.

According to the vehicle body structure of the third aspect, the vehicle width direction end portion of the instrument panel reinforcement is configured to be fixed to the vehicle body by the attachment member, which is used for connection of the pillar reinforcing section with the front pillar lower member.

Consequently, connection between the pillar reinforcing section and the front pillar lower member and attachment of the instrument panel reinforcement to the vehicle body can be carried out using the same attachment member.

As explained above, the vehicle body structure of the first aspect of the present disclosure enables releasing of a connection state between the front pillar upper member and the front pillar lower member, while making it possible to ensure rigidity with respect to a load in the vehicle width direction at the boundary portion between the front pillar upper member and the front pillar lower member.

In the vehicle body structure of the second aspect of the present disclosure, rigidity of the boundary portion between the front pillar upper member and the front pillar lower member with respect to a load in the vehicle width direction can be further ensured, while reducing the number of man-hours for assembly of the vehicle body.

In the vehicle body structure of the third aspect of the present disclosure, the number of components of the vehicle body can be reduced, and the number of man-hours required to assemble the vehicle body can be reduced.

BRIEF DESCRIPTION OF THE DRAWINGS

Embodiments of the present invention will be described in detail based on the following figures, wherein.

DESCRIPTION

First Exemplary Embodiment

An example of an exemplary embodiment of a vehicle body structure according to the present disclosure is explained below, with reference to FIG. 1 to FIG. 4. It should be noted that arrow FR appropriately illustrated in the respective drawings indicates a vehicle front side, arrow UP indicates a vehicle upper side, and arrow LH indicates a vehicle width direction left side.

Figure 4:
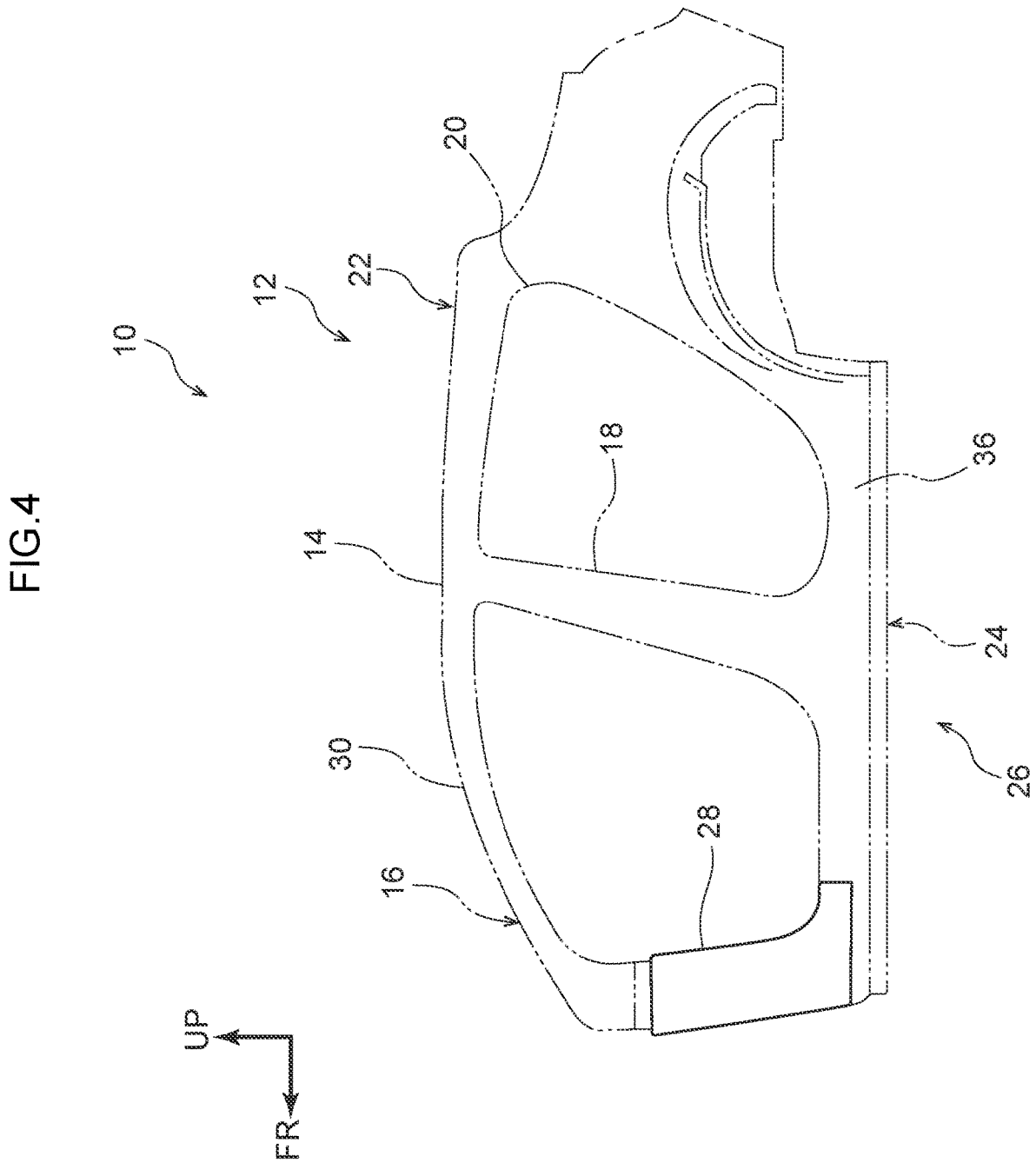
FIG. 4 is a side view illustrating a configuration of the vehicle body to which the vehicle body structure according to the first exemplary embodiment has been applied.

First, a schematic configuration of a "vehicle body 12" of a "vehicle 10" to which the vehicle body structure according to the present exemplary embodiment has been applied will be explained, with reference to FIG. 4. It should be noted that, in the present exemplary embodiment, since the vehicle body 12 is basically configured in a bilaterally symmetrical manner, a configuration of a portion at a vehicle width direction left side of the vehicle body 12 will mainly be explained below, and explanation regarding a configuration of a portion at a vehicle width direction right side will be appropriately omitted.

The vehicle body 12 is configured by detachably connecting a body upper member 22 configured to include a roof section 14, a portion at a vehicle upper side of a "front pillar 16" configuring a portion at a vehicle front side of the vehicle body 12, a center pillar 18 and a rear pillar 20, and a body lower member 26 configured to include a portion at a vehicle lower side of the front pillar 16 and a floor section 24.

Further, the present exemplary embodiment is characterized in that the front pillar 16 is configured to include a "front pillar lower member 28" configuring a portion at a vehicle lower side thereof, and a "front pillar upper member 30" configuring a portion at a vehicle upper side thereof. Configurations of the front pillar 16 configuring a main portion of the present exemplary embodiment, and of portions at a periphery thereof, will be explained below in detail.

Figure 1:
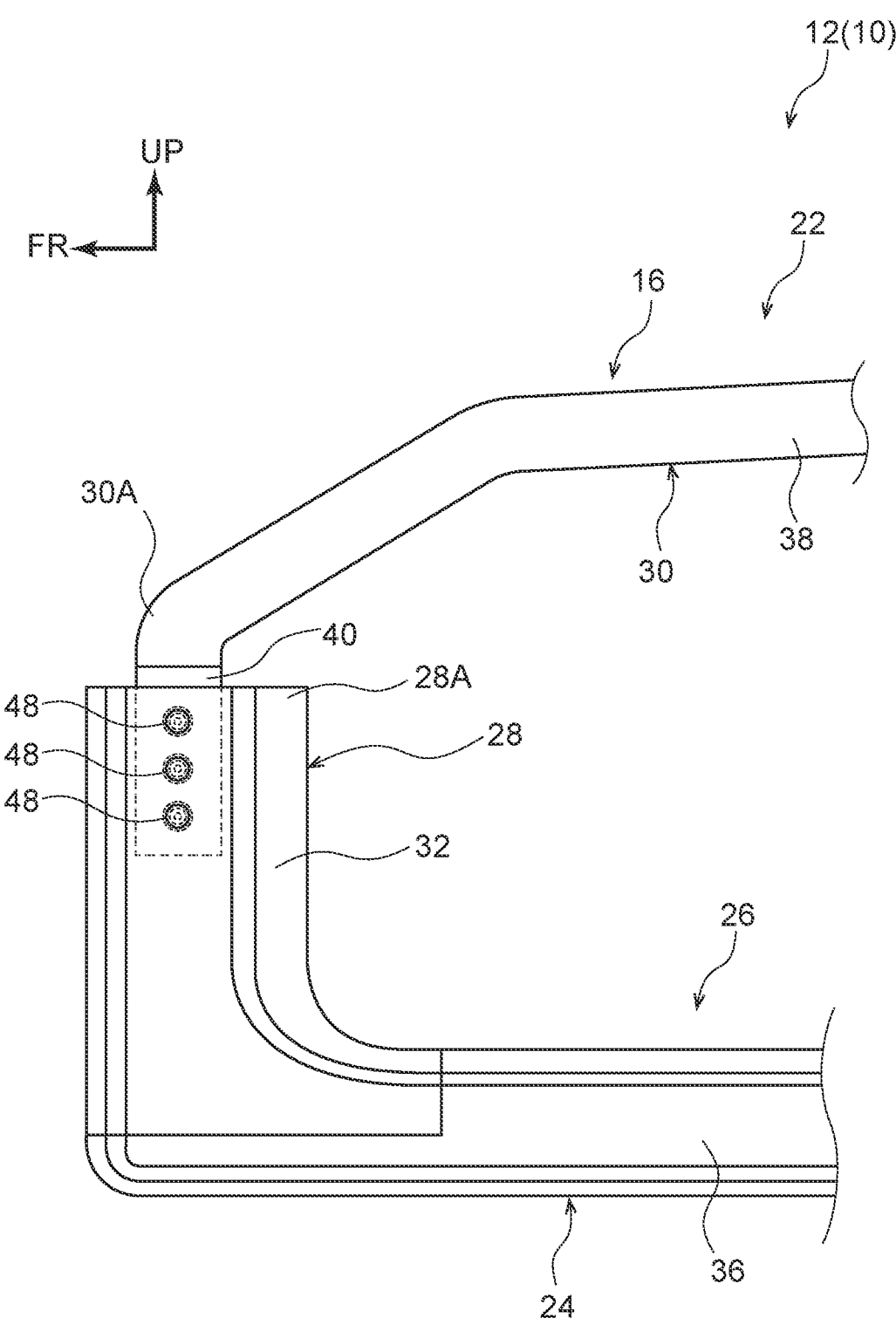
FIG. 1 is a side view schematically illustrating a structure around a front pillar in a vehicle body to which a vehicle body structure according to a first exemplary embodiment has been applied.
Figure 3:
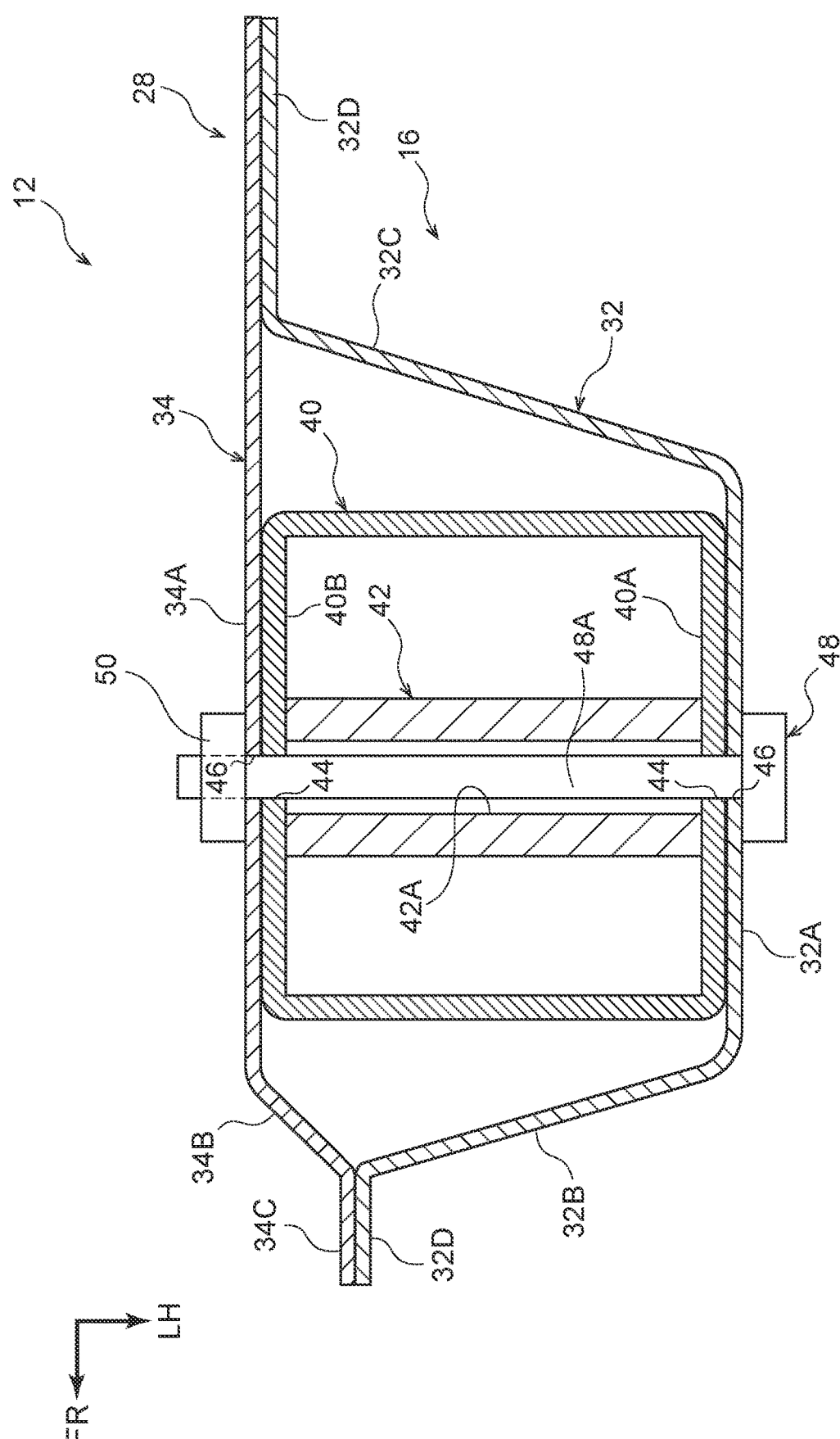
FIG. 3 is a cross-sectional view, seen from a vehicle upper side, schematically illustrating the structure around the connection portion between the front pillar lower member and the front pillar upper member in the vehicle body to which the vehicle body structure according to the first exemplary embodiment has been applied, and is a cross-sectional view taken along line 3-3 in FIG. 2.

First, a configuration of the front pillar lower member 28 will be explained. As illustrated in FIG. 1 and FIG. 3, the front pillar lower member 28 is configured to include a pillar lower outer member 32 configuring a portion at a vehicle width direction outer side thereof, and a pillar lower inner member 34 configuring a portion at a vehicle width direction inner side thereof. It should be noted that the pillar lower outer member 32 and the pillar lower inner member 34 are each configured by pressing a steel plate.

The pillar lower outer member 32 includes a side wall section 32A, a front wall section 32B, a rear wall section 32C, and a pair of flange sections 32D, and is configured in a hat shape in which a cross-sectional shape seen from a vehicle up-down direction is open at a vehicle width direction inner side.

The side wall section 32A configures a portion at a vehicle width direction outer side of the pillar lower outer member 32, and is configured to have a plate shape extending in the vehicle up-down direction with a plate thickness direction thereof being the vehicle width direction. The front wall section 32B extends from a peripheral edge portion at a vehicle front side of the side wall section 32A toward a vehicle frontward and inward side, and the rear wall section 32C extends from a peripheral edge portion at a vehicle rear side of the side wall section 32A toward a vehicle rearward and inward side. Further, the flange sections 32D respectively extend from a peripheral edge portion at a vehicle front side of the front wall section 32B toward a vehicle front side, and from a peripheral edge portion at a vehicle rear side of the rear wall section 32C toward a vehicle rear side.

Meanwhile, the pillar lower inner member 34 is configured to include a side wall section 34A, a front wall section 34B, and a flange section 34C. The side wall section 34A configures a main portion of the pillar lower inner member 34, and is configured to have a plate shape extending in the vehicle up-down direction with a plate thickness direction thereof being the vehicle width direction.

The front wall section 34B extends from a peripheral edge portion at a vehicle front side of the side wall section 34A toward a vehicle frontward and outward side, and the flange section 34C extends from a peripheral edge portion at a vehicle front side of the front wall section 34B toward the vehicle front side.

Further, the flange section 32D at the vehicle front side of the pillar lower outer member 32 is joined to the flange section 34C of the pillar lower inner member 34, and the flange section 32D at the vehicle rear side of the pillar lower outer member 32 is joined to a peripheral edge portion at the vehicle rear side of the side wall section 34A of the pillar lower inner member 34, at non-illustrated joining sections formed by welding or the like, respectively. Consequently, the front pillar lower member 28 has a closed cross-sectional structure configured to have a trapezoidal closed cross-section in which a cross-sectional shape seen from the vehicle up-down direction is widened along a direction toward a vehicle width direction inner side.

It should be noted that a portion at a vehicle lower side of the front pillar lower member 28 is integrated with a rocker 36 by being joined to the rocker 36, which configures a portion at a vehicle width direction outer side of the floor section 24, at a non-illustrated joining section formed by welding or the like.

Meanwhile, the front pillar upper member 30 extends toward a vehicle rearward and upward side from an upper end section 28A of the front pillar lower member 28. The front pillar upper member 30 is configured to include a pillar upper outer member 38 configuring a portion at a vehicle width direction outer side thereof, and a non-illustrated pillar upper inner member configuring a portion at a vehicle width direction inner side thereof, and has a closed cross-sectional structure in which a cross-sectional shape seen from an extending direction thereof is a closed cross-section. It should be noted that the pillar upper outer member 38 and the pillar upper inner member are each configured by pressing a steel plate.

A pillar reinforcing section 40 is provided at a lower end section 30A of the front pillar upper member 30. More specifically, the pillar reinforcing section 40 is configured by a rectangular steel pipe and extends in the vehicle up-down direction, and a portion at a vehicle upper side of the pillar reinforcing section 40 is connected to the lower end section 30A of the front pillar upper member 30 by a joining section or an attachment member formed by welding or the like. Most of the pillar reinforcing section 40 is inserted into the front pillar lower member 28 from the vehicle upper side.

Figure 2:
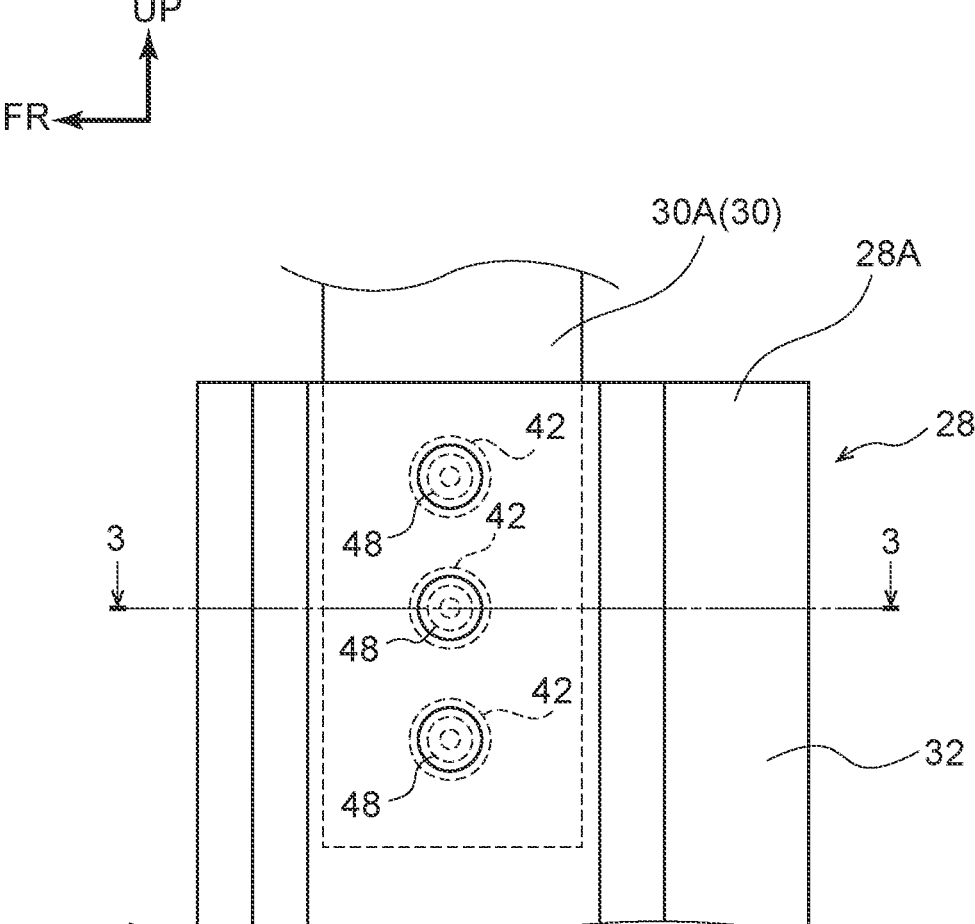
FIG. 2 is an enlarged side view schematically illustrating a structure around a connection portion between a front pillar lower member and a front pillar upper member in the vehicle body to which the vehicle body structure according to the first exemplary embodiment has been applied.

Further, as also illustrated in FIG. 2, a collar 42 serving as a supporting section is disposed at an inner side of the pillar reinforcing section 40. The collar 42 is made of metal, for example, is configured to have a cylindrical shape, and is disposed with an axial direction thereof being the vehicle width direction. Namely, a penetrating section 42A formed at the collar 42 extends in the vehicle width direction. Plural collars 42 (three as an example) are disposed at predetermined intervals in the vehicle up-down direction.

It should be noted that an end portion at a vehicle width direction outer side of the collar 42 is joined to a side wall section 40A at a vehicle width direction outer side of the pillar reinforcing section 40, and an end portion at a vehicle width direction inner side of the collar 42 is joined to a side wall section 40B at a vehicle width direction inner side of the pillar reinforcing section 40, at non-illustrated joining sections formed by welding or the like, respectively.

Further, penetrating sections 44 are respectively formed at positions overlapping with the penetrating section 42A in each of the side wall section 40A and the side wall section 40B. Moreover, in a state in which the pillar reinforcing section 40 is inserted into the front pillar lower member 28, penetrating sections 46 are respectively formed at positions overlapping with the penetrating section 42A in each of the side wall section 32A and the side wall section 34A of the front pillar lower member 28.

Then, the front pillar lower member 28 and the front pillar upper member 30 are connected by fastening a nut 50 at a shaft section 48A in a state in which the shaft section 48A of a bolt 48 serving as an attachment member is inserted from a vehicle width direction outer side through the penetrating sections 44 of the pillar reinforcing section 40, the penetrating section 42A of the collar 42, and the penetrating sections 46 of the front pillar lower member 28. It should be noted that, in place of the nut 50, a weld nut joined to the side wall section 34A of the pillar lower inner member 34 from a vehicle width direction inner side may be used.

Operation and Effects of the Present Exemplary Embodiment

Next, operation and effects of the present exemplary embodiment will be explained.

As illustrated in FIG. 1 and FIG. 3, in the present exemplary embodiment, a portion at a vehicle lower side of the front pillar 16 configuring a portion at a vehicle front side of the vehicle body 12 is configured by the front pillar lower member 28, and a cross-section, seen from the vehicle up-down direction, of the front pillar lower member 28 has a closed cross section.

Further, the front pillar upper member 30 configuring a portion at a vehicle upper side of the front pillar 16 is disposed at a vehicle upper side of the front pillar lower member 28.

Incidentally, it is considered that, if the lower end section 30A of the front pillar upper member 30 is connected in a state in which it is mounted at the upper end section 28A of the front pillar lower member 28, the rigidity of a boundary portion between the front pillar upper member 30 and the front pillar lower member 28 with respect to a load in the vehicle width direction may be insufficient.

In this regard, in the present exemplary embodiment, the pillar reinforcing section 40 is provided with respect to the front pillar upper member 30. Further, the pillar reinforcing section 40 is in a state in which a portion thereof is inserted into the front pillar lower member 28.

Consequently, when a load in the vehicle width direction is input to the boundary portion between the front pillar upper member 30 and the front pillar lower member 28, the load is supported by portions of the pillar reinforcing section 40 and the front pillar lower member 28, enabling bending rigidity with respect to the load in the front pillar 16 to be ensured.

Further, the pillar reinforcing section 40 is detachably attached to the front pillar lower member 28 with the bolt 48 and the nut 50, enabling the front pillar upper member 30 to be detached from the front pillar lower member 28.

Accordingly, releasing of a connection state between the front pillar upper member 30 and the front pillar lower member 28 is enabled, while making it possible to ensure rigidity with respect to a load in the vehicle width direction at the boundary portion between the front pillar upper member 30 and the front pillar lower member 28.

Further, the collar 42 including the penetrating section 42A extending in the vehicle width direction is disposed at the inner side of the pillar reinforcing section 40. Then, the bolt 48 is inserted through the penetrating section 42A of the collar 42, and connects the front pillar lower member 28 and the pillar reinforcing section 40 in the vehicle width direction.

Consequently, connection points between the pillar reinforcing section 40 and the front pillar lower member 28 can be consolidated in the vehicle width direction, and the pillar reinforcing section 40 and the front pillar lower member 28 can be connected to each other without performing work for connecting the pillar reinforcing section 40 and the front pillar lower member 28 at both the vehicle width direction outer side and the vehicle width direction inner side.

Further, the pillar reinforcing section 40 is reinforced by the collar 42, enabling deformation of the pillar reinforcing section 40 due to a load in the vehicle width direction to be suppressed. Accordingly, rigidity of the boundary portion between the front pillar upper member 30 and the front pillar lower member 28 with respect to a load in the vehicle width direction can be further ensured, while reducing the number of man-hours for assembly of the vehicle body 12.

In addition, as compared to a configuration in which the front pillar lower member 28 and the front pillar upper member 30 are joined together at a joining section formed by welding or the like, the number of man-hours required to release the connection state between the front pillar lower member 28 and the front pillar upper member 30 can be reduced, and thus, the number of man-hours required to disassemble the vehicle body 12 can be reduced.

Second Exemplary Embodiment

Next, a vehicle body structure according to a second exemplary embodiment of the present disclosure will be explained, with reference to FIG. 5 to FIG. 7. It should be noted that the same reference numerals are allocated to constituent elements that are common to the aforementioned first exemplary embodiment, and explanation thereof is appropriately omitted.

Figure 5:
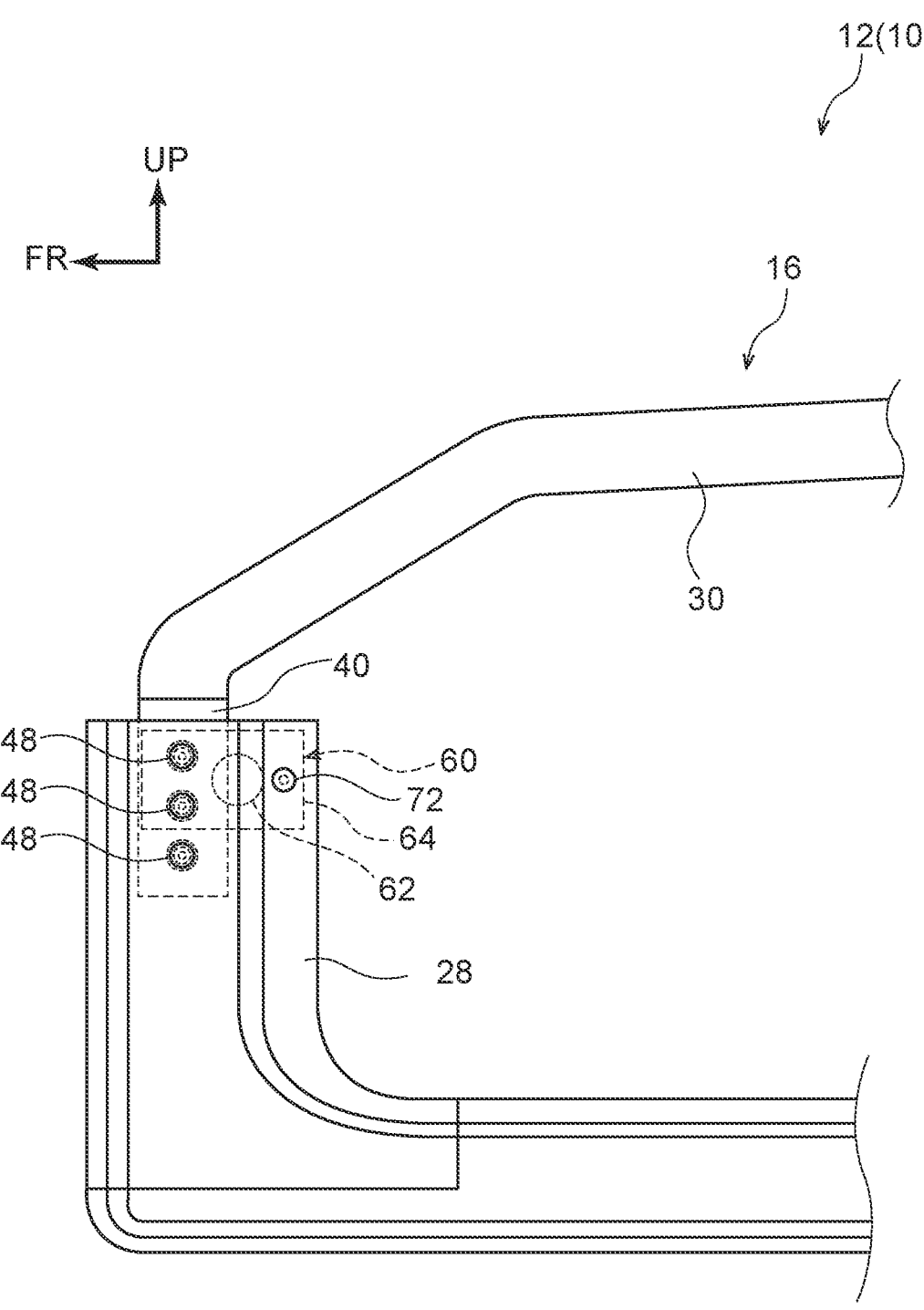
FIG. 5 is a side view schematically illustrating a structure around a front pillar in a vehicle body to which a vehicle body structure according to a second exemplary embodiment has been applied.

As illustrated in FIG. 5, the present exemplary embodiment is characterized in that an instrument panel reinforcement 60 disposed between a pair of front pillars 16 is attached to the vehicle body 12 using bolts 48 connecting the front pillar lower member 28 and the front pillar upper member 30.

Figure 6:
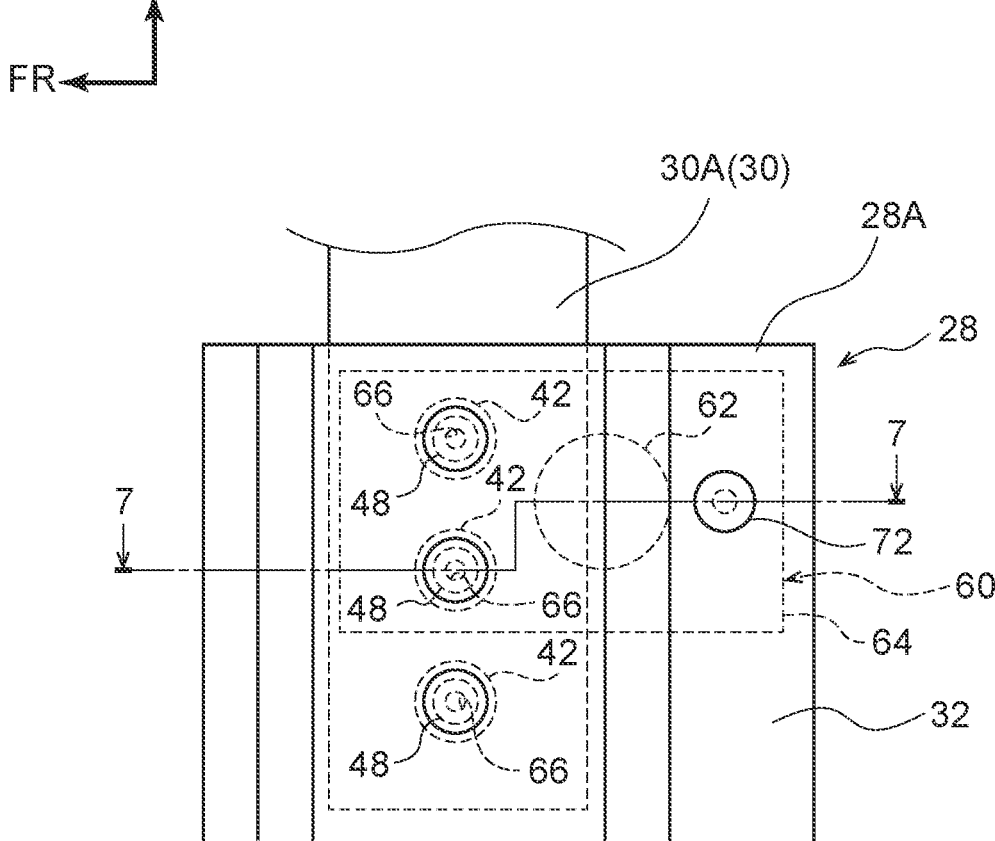
FIG. 6 is an enlarged side view schematically illustrating a structure around a connection portion between a front pillar lower member and a front pillar upper member in the vehicle body to which the vehicle body structure according to the second exemplary embodiment has been applied.
Figure 7:
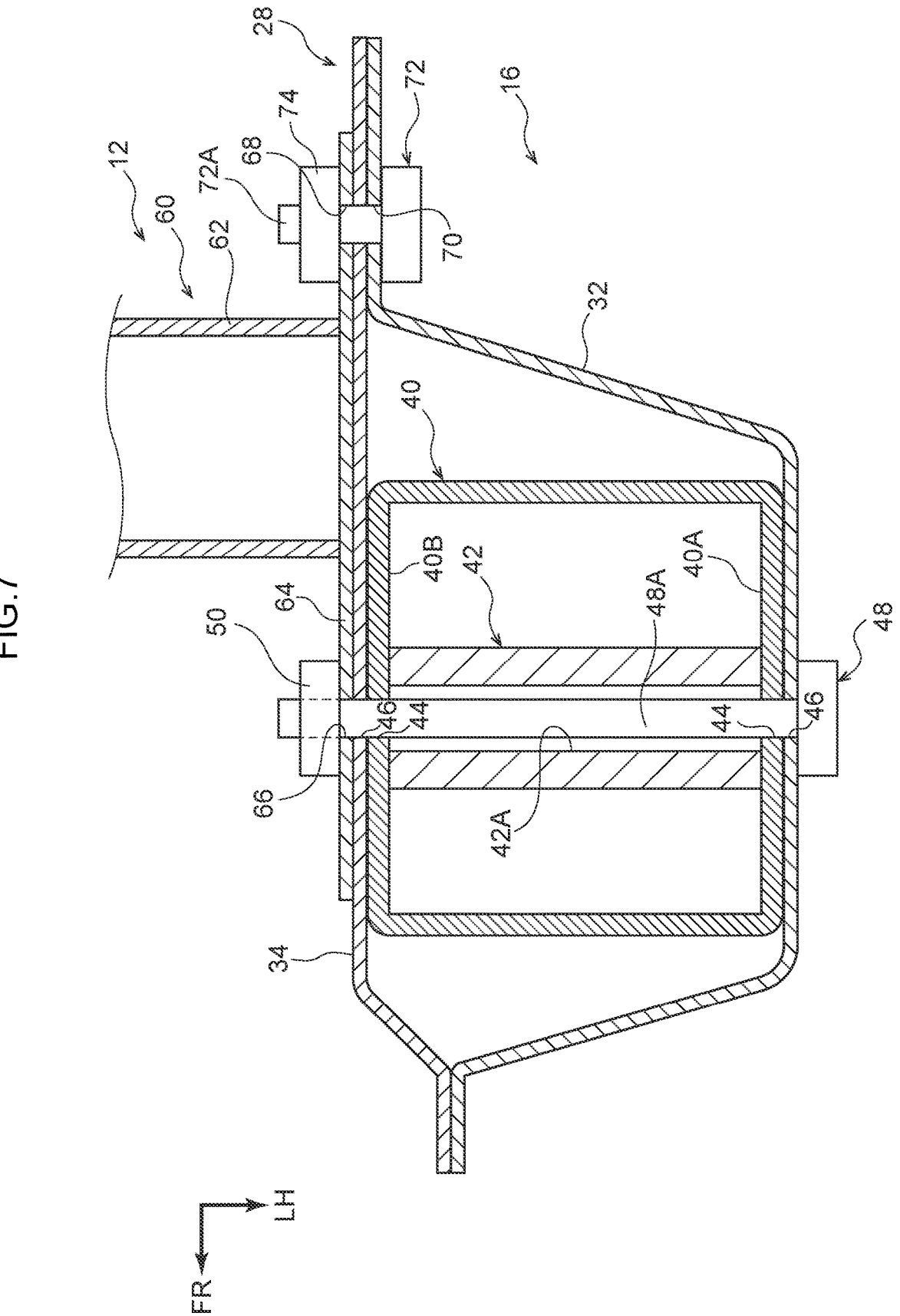
FIG. 7 is a cross-sectional view, seen from the vehicle upper side, schematically illustrating the structure around the connection portion between the front pillar lower member and the front pillar upper member in the vehicle body to which the vehicle body structure according to the second exemplary embodiment has been applied, and is a cross-sectional view taken along line 7-7 in FIG. 6.

More specifically, as also illustrated in FIG. 6 and FIG. 7, the instrument panel reinforcement 60 is configured to include a main body section 62 that is capable of supporting a non-illustrated steering column or the like, and a pair of base plates 64. The main body section 62 is configured by a round steel pipe and extends in the vehicle width direction. Each base plate 64 is formed in a rectangular plate shape having a thickness direction that is in the vehicle width direction and a longitudinal direction that is in the vehicle front-rear direction, and is joined to an end portion of the main body section 62 at a non-illustrated joining section formed by welding or the like.

Further, two penetrating sections 66 are provided, at the same pitch as the penetrating sections 46 of the front pillar lower member 28, at a portion at a vehicle front side of the base plate 64, and a penetrating section 68 is provided at a portion at a vehicle rear side of the base plate 64. It should be noted that, in the present exemplary embodiment, a penetrating section 70 corresponding to the penetrating section 68 is provided at the front pillar lower member 28.

Further, in the present exemplary embodiment, in a state in which the shaft section 48A of the bolt 48 is inserted from a vehicle width direction outer side through the penetrating sections 44 of the pillar reinforcing section 40, the penetrating section 42A of the collar 42, the penetrating sections 46 of the front pillar lower member 28, and the penetrating section 66 of the base plate 64, the nut 50 is fastened to the shaft section 48A from a vehicle width direction inner side of the base plate 64. It should be noted that, in place of the nut 50, a weld nut joined to the base plate 64 from the vehicle width direction inner side may be used.

Meanwhile, a shaft section 72A of a bolt 72 is inserted through the penetrating section 68 of the base plate 64 and the penetrating section 70 of the front pillar lower member 28 in the vehicle width direction, and a nut 74 is fastened to the shaft section 72A from the vehicle width direction inner side of the base plate 64. It should be noted that, in place of the nut 74, a weld nut joined to the base plate 64 from the vehicle width direction inner side may be used.

In the present exemplary embodiment configured as described above, as illustrated in FIG. 7, the end portion in the vehicle width direction of the instrument panel reinforcement 60 is fixed with respect to the vehicle body 12 by the bolt 48 used to connect the front pillar upper member 30 and the front pillar lower member 28 together.

Consequently, in the present exemplary embodiment, connection between the front pillar upper member 30 and the front pillar lower member 28 and attachment of the instrument panel reinforcement 60 to the vehicle body 12 can be carried out using the same bolt 48. Accordingly, the number of components of the vehicle body 12 can be reduced, and the number of man-hours required to assemble the vehicle body 12 can be reduced.

Supplementary Explanation of the Exemplary Embodiments (1) Although the pillar reinforcing section 40 is configured by a separate member from the front pillar upper member 30 in the exemplary embodiments described above, a configuration may be provided in which a portion of the front pillar upper member 30 is inserted into the front pillar lower member 28 so as to function as the pillar reinforcing section, in accordance with the specifications or the like of the vehicle 10.

(2) Further, although the collar 42 is disposed at the inner side of the pillar reinforcing section 40 in the exemplary embodiments described above, a configuration may be adopted in which the collar 42 is not disposed at the inner side of the pillar reinforcing section 40, in accordance with the specifications or the like of the vehicle 10. Furthermore, in a case in which such a configuration is employed, weld nuts may be respectively provided at the side wall section 40A and the side wall section 40B at the inner side of the pillar reinforcing section 40, and bolts connecting the pillar reinforcing section 40 and the front pillar lower member 28 may be fastened to these weld nuts.

(3) In addition, although the constituent members of the vehicle body 12, such as the front pillar 16 and the like, are configured of steel in the exemplary embodiments described above, these constituent members may be configured of carbon fiber reinforced resin or the like, in accordance with the specifications or the like of the vehicle 10. Furthermore, in a case in which such a configuration is employed, the collar 42 may be joined to the pillar reinforcing section 40 at a joining section formed by an adhesive or the like.

What is claimed is:

1. A vehicle body structure comprising:

a front pillar lower member configuring a portion, at a vehicle lower side, of a front pillar that configures a portion, at a vehicle front side, of a vehicle body, a cross-section of the front pillar lower member seen from a vehicle up-down direction having a closed cross-section;

a front pillar upper member disposed at a vehicle upper side of the front pillar lower member, and the front pillar upper member configuring a portion at a vehicle upper side of the front pillar; and a pillar reinforcing section provided with respect to the front pillar upper member, the pillar reinforcing section being partially insertable into the front pillar lower member, and the pillar reinforcing section being detachably attached to the front pillar lower member by an attachment member, wherein the pillar reinforcing section is configured by a rectangular steel pipe and extends in the vehicle up-down direction, a portion at a vehicle upper side of the pillar reinforcing section is connected to the lower end section of the front pillar upper member, and remaining part of the pillar reinforcing section is inserted into the front pillar lower member.

2. The vehicle body structure according to claim 1, further comprising a supporting section that is disposed at an inner side of the pillar reinforcing section and that includes a penetrating section extending in a vehicle width direction, wherein the attachment member is inserted through the penetrating section, and connects the front pillar lower member and the supporting section in the vehicle width direction, wherein an end portion at a vehicle width direction outer side of the supporting section is joined to a side wall section at a vehicle width direction outer side of the pillar reinforcing section by welding, and an end portion at a vehicle width direction inner side of the supporting section is joined to a side wall section at a vehicle width direction inner side of the pillar reinforcing section by welding.

3. The vehicle body structure according to claim 1, wherein an end portion in a vehicle width direction of an instrument panel reinforcement is configured to be fixed to the vehicle body by the attachment member, which connects the pillar reinforcing section with the front pillar lower member.

4. The vehicle body structure according to claim 2, wherein an end portion in a vehicle width direction of an instrument panel reinforcement is configured to be fixed to the vehicle body by the attachment member, which connects the pillar reinforcing section with the front pillar lower member.

* * * * *